United States Patent [19]

Brown

[11] 4,385,547
[45] May 31, 1983

[54] HYDRAULIC BRAKE BOOSTER

[75] Inventor: Arthur K. Brown, South Bend, Ind.

[73] Assignee: The Bendix Corporation, Southfield, Mich.

[21] Appl. No.: 233,712

[22] Filed: Feb. 12, 1981

[51] Int. Cl.³ .............................................. F15B 9/10
[52] U.S. Cl. ..................................... 91/384; 60/547.3
[58] Field of Search ................... 91/384, 391 R, 459; 60/547 B

[56] References Cited

U.S. PATENT DOCUMENTS

| | | | |
|---|---|---|---|
| 1,825,611 | 9/1931 | Bangerter | 91/384 |
| 1,855,386 | 4/1932 | Doolittle et al. | 91/384 |
| 3,969,985 | 7/1976 | Grieger | 91/459 |

FOREIGN PATENT DOCUMENTS 26-13068  7/1951  Japan.

Primary Examiner—Paul E. Maslousky

[57] ABSTRACT

A hydraulic brake booster includes a housing (10) which movably supports a piston (16) and a control valve (20). The housing also substantially defines a pressure chamber (22) for receiving fluid pressure via the control valve (20) to move the piston (16). The housing (10) is formed from a first cylinder (90) and a second cylinder (92) which is substantially perpendicular to the first cylinder. The first cylinder receives the piston and the second piston receives the control valve. A linkage assembly (40) imparts movement to the control valve during a brake application.

2 Claims, 2 Drawing Figures

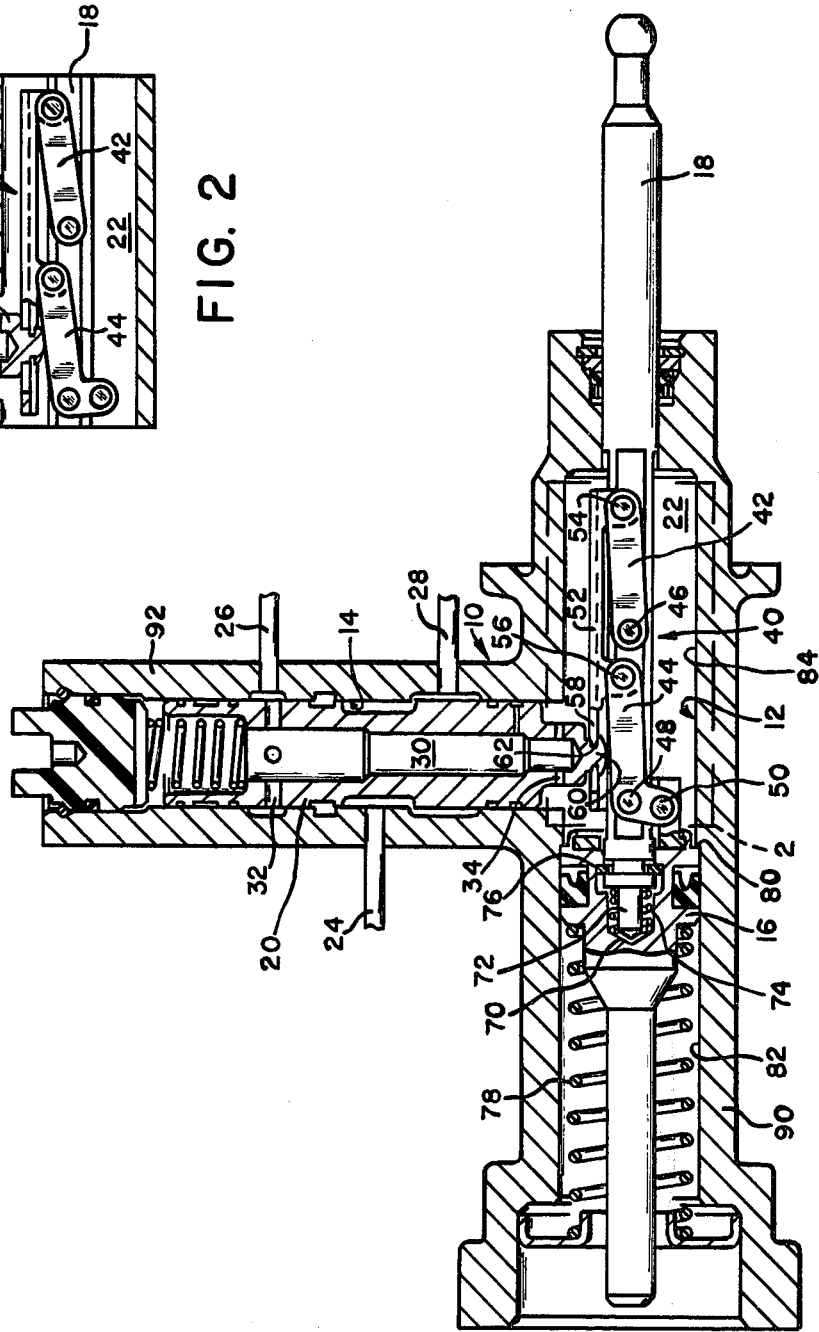

HYDRAULIC BRAKE BOOSTER

This invention relates to a hydraulic brake booster wherein fluid pressure is communicated to a pressure chamber to bias a piston to a braking position.

In general, a hydraulic brake booster provides a housing defining the pressure chamber and movably supporting a piston and a control valve. An input assembly extends into the housing to engage the control valve such that acutation of the control valve by the input assembly communicates fluid pressure to the pressure chamber. The fluid pressure, in turn, moves the piston within the housing to provide power assist during a brake application.

Heretofore, the control valve and the piston in the prior art have been movably disposed within the housing in a pair of bores which are parallel. Therefore, the dimension of the pressure chamber was larger than the diameter of the piston. The parallel relationship between the bores with a common wall separating the bores also limited the orientation for the ports required to communicate fluid to the control valve.

The present invention provides a hydraulic brake booster which is simple in construction. The hydraulic brake booster includes a housing substantially defining a pressure chamber, a pressure responsive member movable in response to fluid pressure communicated to the pressure chamber, a control valve disposed within the housing and operable during a brake application to communicate the fluid pressure to the pressure chamber, and an input member extending into the housing to cooperate with the control valve, characterized by said housing substantially defining a first cylinder with a bore therethrough for receiving said pressure responsive member and said input member, and said housing substantially defining a second cylinder extending in a perpendicular direction from said first cylinder, said second cylinder defining a bore for receiving said control valve.

An advantage offered by the present invention is universal access to the second cylinder to locate the ports for communication of fluid to the control valve. Also, with the control valve located in a second cylinder leading to the first cylinder, the housing comprises a simple construction made from a pair of substantially intersecting perpendicular cylinders.

One way of carrying out the invention is illustrated in the accompanying drawings, in which:

FIG. 1 is a side cross-sectional view of a hydraulic brake booster constructed in accordance with the invention and shown in a rest position; and FIG. 2 is a view of the encircled portion of FIG. 1 showing the parts therein in the applied position.

The brake booster of FIG. 1 includes a housing 10 defining a first bore 12 and a second bore 14. The bore 12 movably receives an output piston 16 and an input member 18. A control valve 20 is movably received within the bore 14. The control valve 20, the input member 18, and the output piston 16 cooperate with the wall of bore 12 to define a pressure chamber 22.

An inlet 24 on the housing is fluidly coupled to a source of fluid pressure (not shown). A return 26 is coupled to a reservoir for the source and an outlet 28 is in communication with an auxiliary fluid motor, such as a power steering assembly (not shown). When the control valve 20 is moved within the bore 14 to a brake-applied position in a manner to be described hereinafter, fluid pressure is communicated from the inlet 24 to the pressure chamber 22 via a control passage 30 within the control valve 20. Radial passages 32 and 34 on the control valve 20 provide a fluid path between the inlet, the central passage 30 and the pressure chamber 22 when the control valve 20 is in the brake-applied position.

In order to control movement of the control valve 20, the input member 18 carries a linkage assembly 40 engageable with the control valve 20 and also engageable with the piston 16. The linkage assembly 40 comprises a pair of levers 42 and 44. The lever 42 is pivotally secured to the input member 18 via pin 46, while the lever 44 is pivotally secured to the input member 18 via pin 48 and also pivotally secured to the piston 16 via pin 50. The pair of levers pivotally carry a plate 52 via respective pins 54 and 56 and the plate 52 defines a slot 58 extending axially on the plate. The slot 58 receives a head 60 integrally formed on the control valve 20 and the head is deformed to define a recess 62 receiving the plate 52. Consequently, separation between the control valve and the plate is prevented; however, the plate is free to move transversely to the control valve via slot 58. The piston 16 is provided with a blind bore 70 receiving one end 72 of input member 18. A first resilient member 74 biases the end 72 of input member 18 to a brake-released position within bore 70 in abutment with snap ring 76. A second resilient member 78 biases the piston 16 to a brake-released position in abutment with a step or shoulder 80 which separates a large diameter portion 82 of bore 12 from a small diameter portion 84 of bore 12. The large diameter portion 82 slidably receives the piston 16 while the small diameter portion 84 is intersected by the bore 14 and substantially receives the linkage assembly 40.

Upon a brake application, the input member 18 is moved to the left to compress resilient member 74 and the input member moves relative to the piston 16 and the control valve 20. The slot 58 moves relative to the head 60 which remains in the slot 58. With the lever 44 pivotally secured to the piston and input member via respective pins 50 and 48, movement between the piston and input member causes the lever 44 to pivot counter-clockwise about pin 50. This pivotal movement for lever 44 imparts movement to the plate 52 and also to the lever 42. With the lever 42 pivotally secured to the input member 18 and the plate 52, the plate 52 moves radially toward the control valve while remaining substantially parallel to the input member and the lever 42 pivots counterclockwise about pin 46. Movement of the plate 52 radially imparts movement to the control valve 20 causing the latter to move upwardly to a brake-applied position communicating fluid pressure to the pressure chamber 22. The brake-applied position for the linkage assembly 40 is shown in FIG. 2. Fluid pressure communicated to the pressure chamber 22 acts against the piston 16 to move the latter to the left in FIG. 1. If the braking effort generated by movement of the piston is sufficient for the vehicle operator, the input member 18 is stopped to permit a slight amount of movement or separation between the piston and input member. Separation between the piston and input member causes the levers 42 and 44 to pivot slightly and move the plate 52 to position the control valve in a closed position retaining the fluid pressure level in the pressure chamber 22. Further braking increases the communication of fluid pressure to the pressure chamber in the same manner described above, while termination of braking reduces all input forces applied to the input member so the spring 74 completely returns the input member to an abutment with snap ring 76 and the plate 52 is returned to its rest position. In the rest position, the plate 52 permits the control valve to move downward to a position venting the pressure chamber 22 via passages 34, 30, 32 and 26 to the reservoir.

The hydraulic brake booster of the present invention is constructed substantially from a first cylinder 90 forming bore 12 and a second cylinder 92 forming bore 14. The second cylinder 92 is perpendicular to the first cylinder 90 so that the ports forming inlet 24, return 26, and outlet 28 can be orientated at any angular position around the second cylinder 92. Also, with the control valve spaced from the output piston and the second cylinder perpendicular to the first cylinder it is possible to substantially confine the pressure chamber 22 to the first cylinder 90. As a result, the size of the pressure chamber and the hydraulic brake booster, in general, is kept small to conserve space.

I claim:

1. In a hydraulic brake booster, a housing substantially defining a pressure chamber, a pressure responsive member movable in response to fluid pressure communicated to the pressure chamber, a control valve disposed within the housing and operable during a brake application to communicate the fluid pressure to the pressure chamber, and an input member extending into the housing to cooperate with the control valve, characterized by said housing substantially defining a first cylinder with a bore therethrough for receiving said pressure responsive member and said input member, and said housing substantially defining a second cylinder extending in a perpendicular direction from said first cylinder, said second cylinder defining a bore for receiving said control valve, said input member supporting a linkage assembly which is engageable with said pressure responsive member and said control valve, said linkage assembly comprising a plate engaging said control valve and a pair of links pivotally engaging said plate and said input member, one of said links also pivotally engaging said pressure responsive assembly.

2. The hydraulic brake booster of claim 1 characterized by said plate including a slot and said control valve is received within said slot to substantially prevent radial separation therebetween.

* * * * *